Feb. 27, 1951 R. S. HARTMAN 2,543,494
REFRIGERATING DEVICE
Filed Dec. 22, 1944 3 Sheets-Sheet 1
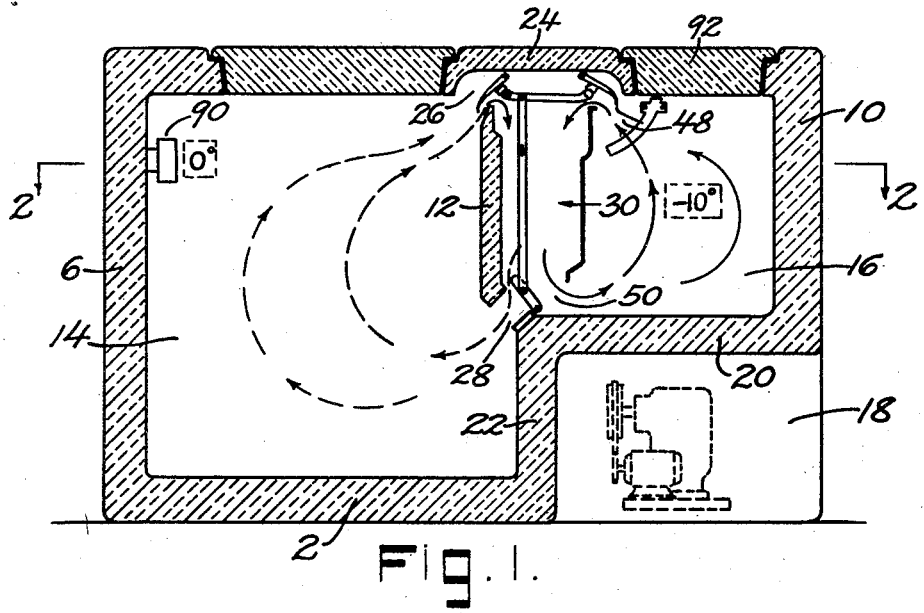
Fig. 1.
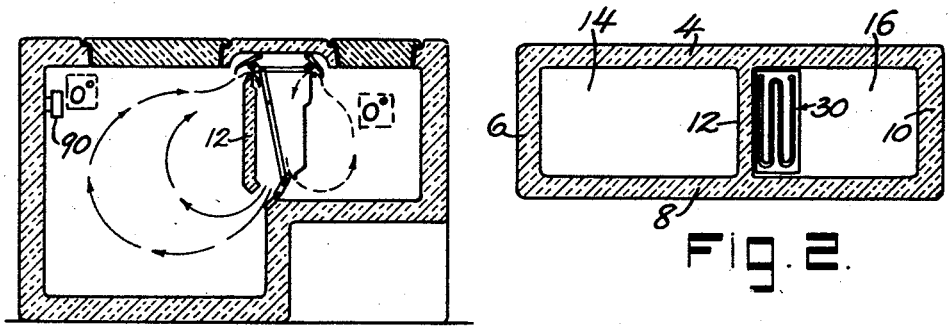
Fig. 2.
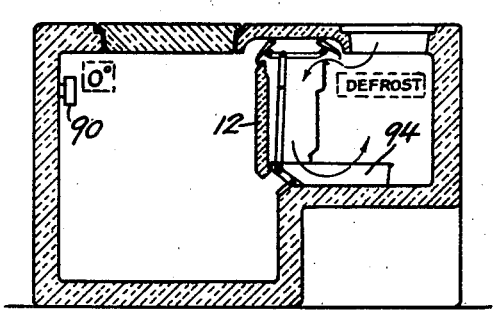
Fig. 6.
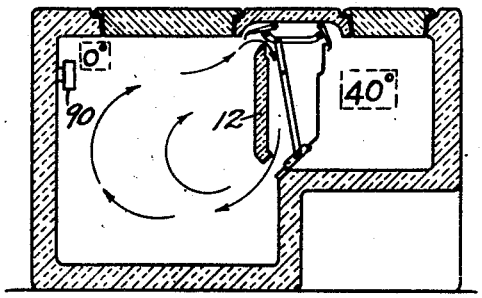
Fig. 7.
Fig. 8.
INVENTOR.
RUSH S. HARTMAN
BY Albert Sperry.
ATTORNEY Feb. 27, 1951 R. S. HARTMAN 2,543,494
REFRIGERATING DEVICE
Filed Dec. 22, 1944 3 Sheets-Sheet 2

INVENTOR.
RUSH S. HARTMAN
BY Albert Sperry.
ATTORNEY

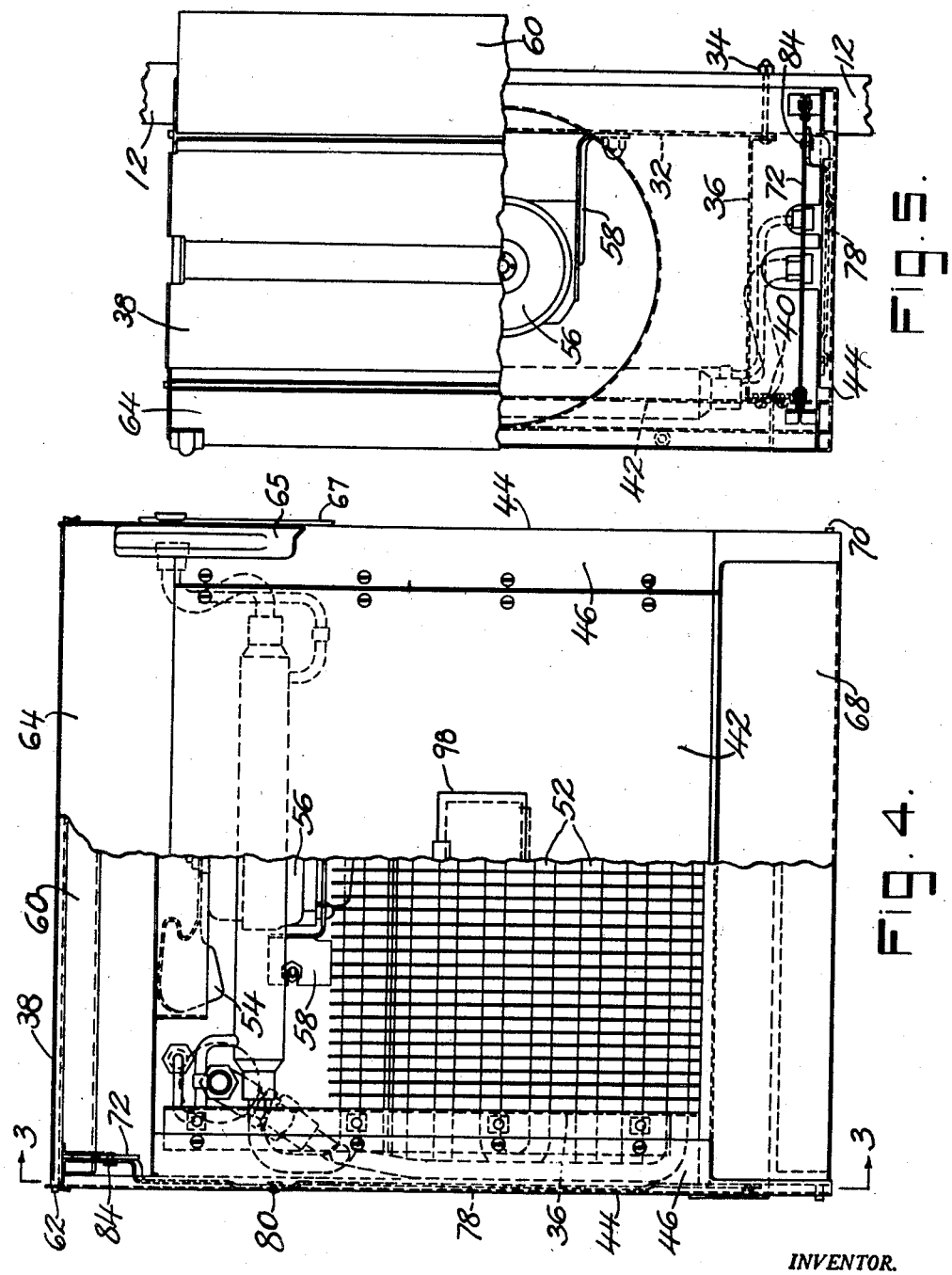

Patented Feb. 27, 1951

2,543,494

UNITED STATES PATENT OFFICE 2,543,494

REFRIGERATING DEVICE

Rush S. Hartman, Trenton, N. J.

Application December 22, 1944, Serial No. 569,326

17 Claims. (Cl. 62—2)

My invention relates to refrigerating equipment and in particular to constructions whereby different compartments or zones within a refrigerating structure may be maintained at different predetermined temperatures.

Many refrigerating constructions in recent years have been designed to maintain products at temperatures well below freezing. However, the equipment which is provided for the storage of frozen products is not adapted for use in freezing some products while holding others under storage conditions and is not adapted for the storage of products which are injured by freezing. For this reason refrigerating equipment of the prior art has generally been designed as a single purpose construction and has not been sufficiently flexible in operation to adapt it for other uses. Thus, for example the refrigerating load required to maintain a given temperature in storage equipment is only that necessary to remove the limited amount of heat passing through the insulated walls of the construction, whereas a very heavy refrigerating load is required to remove the large amount of heat necessary to reduce products from room temperature to a frozen condition. The temperature of a storage compartment will therefore rise rapidly and remain at a dangerously high temperature for a considerable time if an appreciable amount of food at room temperature is placed in a construction designed primarily for the storage of frozen foods. On the other hand it is not generally desirable or necessary to freeze a large quantity of food or other products at one time and therefore it is not economically practical or feasible to provide freezing equipment with a capacity large enough for use in the storage of frozen products or to provide storage equipment with excessively large compressors, coils and other apparatus in order that it may be operated occasionally as freezing equipment upon every addition of a small amount of food to the storage chamber.

The lack of flexibility of control and the character of the construction used in prior low temperature storage and freezing equipment has further limited its use in that it has not been possible to employ equipment designed for the freezing or storage of foods at low temperature to supplement the usual domestic refrigerator for storage of milk, fruit or other products which would be injured if frozen or cooled to a temperature in the neighborhood of that required for safe storage of frozen foods. Even though a portion of a low temperature storage cabinet may be empty or not required for freezing or storage purposes it has not been safe heretofore to use such space for even temporary storage on those occasions when the domestic refrigerator is overloaded and additional relatively high temperature storage space is required.

Low temperature storage and freezing equipment as heretofore constructed has also presented considerable difficulty when it is necessary to defrost the plates, coils or tubes of the refrigerating elements. It has been necessary at such times to remove the products from the cabinet and to scrape the frost or ice from the coils by hand and then to restore the cabinet to the desired low temperature before returning the products to storage. This is a slow and expensive procedure and there is always considerable danger of loss or deterioration of the products during the period in which they are removed from the storage compartment.

In accordance with my invention the freezing and the storing of products may be carried out in the same structure and with a single refrigerating unit and overflow from a domestic refrigerator may be transferred to the structure for temporary or prolonged storage. Moreover, the construction of the equipment and the control thereof is such as to render it possible to maintain one compartment of a structure at a relatively low temperature and another at the same or a higher or lower temperature. Thus, while maintaining frozen products stored at a predetermined temperature, additional products may be frozen or they may be refrigerated to a limited extent only or both compartments may be maintained at a uniform temperature for storage of additional frozen products. My invention also provides for defrosting of the coil or refrigerating means while maintaining products being stored at the desired low temperature.

These advantages are attained by providing novel refrigerating means which are in communication with two compartments in a structure and controlled so that the operation of the refrigerating means and the amount and direction of flow of air over such means and through the compartments will produce and maintain the desired temperatures therein.

One of the objects of my invention is to provide novel and effective means for controlling the temperature of two compartments in a refrigerated structure.

Another object of my invention is to provide improved means for freezing and storing products.

Another object of my invention is to provide a refrigerated construction having different compartments therein together with means for maintaining each compartment at a selected predetermined temperature.

Still another object of my invention is to provide means whereby the frost that collects on the evaporator cooling unit can be removed without affecting the products in the storage compartment or materially lowering the temperature of this compartment.

These and other objects and features of my invention will appear from the following description thereof in which reference is made to the figures of the accompanying drawings.

In the drawings:

Fig. 1 is a diagrammatic vertical sectional view through a typical refrigerated structure embodying my invention.

Fig. 2 is a similar horizontal sectional view through the construction shown in Fig. 1 taken on line 2—2 thereof.

Fig. 4 is a front elevation of the refrigerating unit illustrated in Fig. 3 with a portion of the front of the housing broken away.

Fig. 5 is a top plan view of the refrigerating unit shown in Fig. 3 with a portion of top of the housing broken away, and Figs. 6, 7 and 8 are diagrammatic vertical sectional views similar to Fig. 1 showing alternative air circuits that may be established within the construction.

Figure 3:
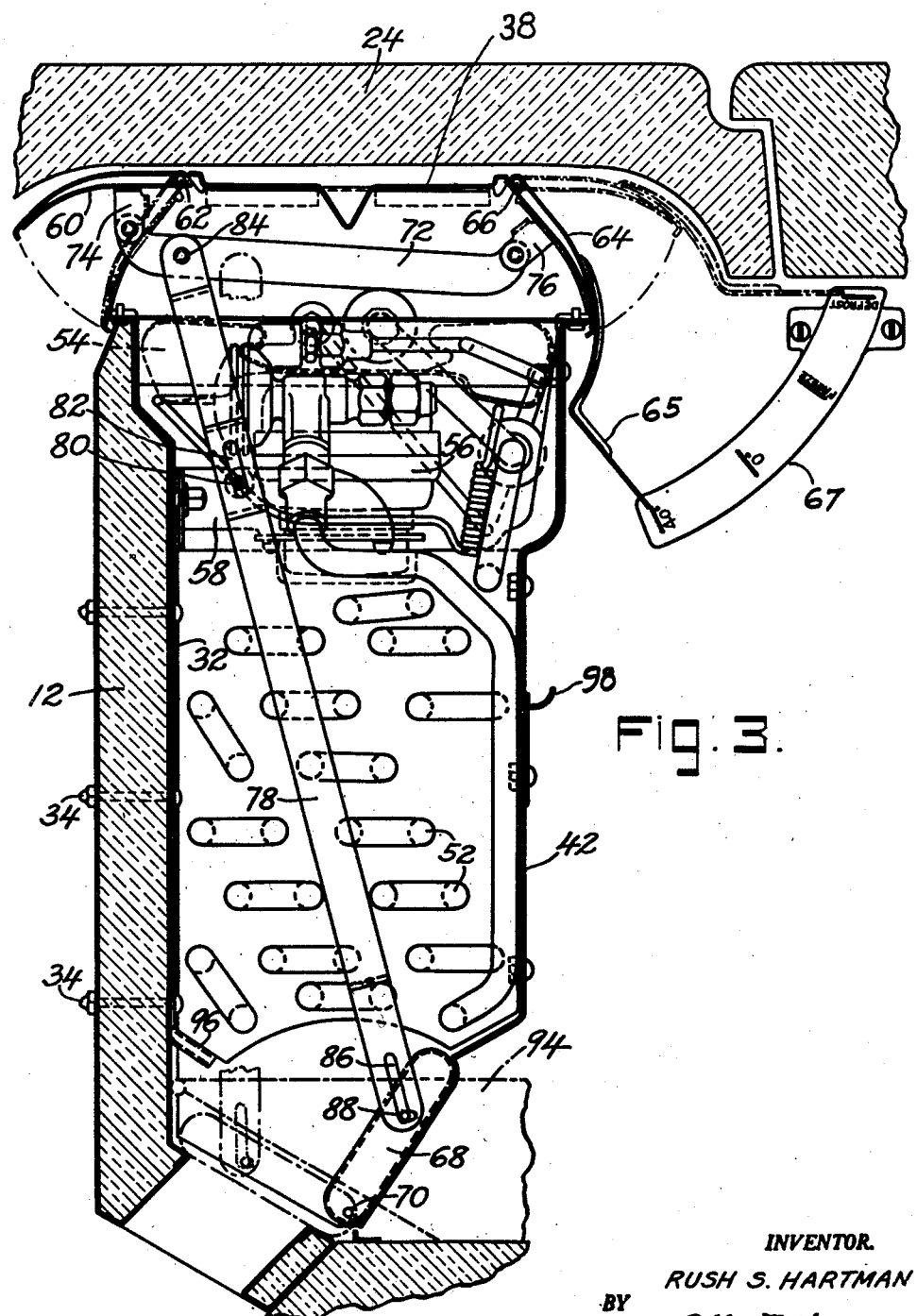
Fig. 3 is an enlarged vertical sectional view through a typical refrigerating unit adapted for use in the structure of Fig. 1 and is taken on line 3—3 of Fig. 4.

In that form of my invention illustrated in the figures of the drawings the structure to be refrigerated embodies a cabinet having a relatively thick insulated bottom 2 and similar thick insulated side walls 4, 6, 8 and 10. An insulated partition wall 12 of somewhat thinner and lighter construction extends across the cabinet from the wall 4 to the wall 8 and serves to divide the interior of the cabinet into a relatively large storage chamber 14 designed to receive frozen products to be preserved and a smaller freezing chamber 16 wherein products may be frozen or maintained at any desired temperature independently of the temperature maintained in the storage chamber. The storage chamber 14 is the full depth of the interior of the cabinet whereas the freezing chamber 16 is considerably shallower and thus provides for a motor and compressor compartment 18 which is located below the freezing chamber and separated therefrom by the thick insulating bottom portion 20. The compressor compartment is also separated from the storage chamber 14 by a thick insulating wall portion 22 and while it may be otherwise inclosed the compressor compartment is not otherwise insulated.

The insulated partition wall 12 which separates the storage chamber from the freezing chamber is formed with its upper and lower edges spaced from the top portion 24 of the cabinet and from the bottom portion 20 of the freezing chamber so that air may pass over the top of the partition wall through the passage 26 from the storage chamber to refrigerating means and may be expelled from the refrigerating means into the storage chamber through the passage 28 beneath the lower edge of the partition wall.

The refrigerating means shown is in the form of a unit 30 which is positioned adjacent the partition wall 12 and preferably is formed so as to be inserted and removed as a unit for ease in installation and servicing of the equipment. In fact the partition wall 12 may itself be inserted and removed with the unit 30 although this is not an essential feature of the construction.

The refrigerating unit 30 is shown as being mounted on that face of the partition wall 12 which faces the freezing chamber 16 and is thus located wholly within the freezing chamber. The unit comprises a housing embodying a back panel 32 having bolts 34 carried thereby and passing through the partition wall 12 to secure the housing and unit in place. Brackets 36 are secured to the back panel 32 and are formed at their outer ends with flanges 40 to which a cover panel 42 is secured. Side panels 44 engage the back panel 32 and cover panel 42 and are formed with inwardly turned vertically extending front edges 46 which are also secured to the flanges 40 on the brackets 36. The housing is further provided with a top 38 which is spaced from the upper edges of the back panel 32 and the cover panel 42. The upper and lower edges of the back panel 32 also are spaced from the top portion 24 and the bottom portion 20 of the case so that the air inlet 26 and air outlet 28 communicating with the storage chamber are not obstructed thereby. The cover panel 42 of the housing is of substantially the same as the back panel 32 and its upper and lower edges are spaced from the top portion 24 and the bottom portion 20 to provide an inlet 48 through which air may pass into the housing from the top of the freezing chamber and an outlet 50 through which air may pass from the housing into the lower portion of the freezing chamber.

Within the housing formed by the panels 32, 42 and 44 is located a refrigerator coil 52 supported by the brackets 36. A fan 54 driven by motor 56 is also located within the housing and is mounted on bracket 58 secured to the back panel 32 above the coil 52. The fan is arranged to draw air from the air inlets 26 and 48, or either of them, and serves to direct it downward through the housing and over coil 52 to the air outlets 28 and 50.

The flow of air through the coil housing and through the storage and freezing chambers is controlled by valves. The direction of flow of the air is indicated by arrows in Figs. 1, 6, and 7. The full arrows represent a large volume of air and the dotted arrows represent only limited flow of air. The valves shown include a valve 60 which is pivotally mounted at 62 on the side panels 44 and is movable into and out of engagement with the upper edge of the insulating partition 12, to vary opening of the air inlet 26 communicating with the upper portion of the storage chamber. A second valve 64 is pivotally mounted at 66 on the side panels and is movable into and out of engagement with the upper edge of the cover panel 42 of the coil housing to vary the opening of the inlet 48 through which air passes to the housing from the upper portion of the freezing chamber. A single valve 68, which as shown may be formed of insulating material, is located near the lower portion of the coil housing and pivoted at 70 on the side panels 44 for movement into and out of engagement with the lower portion of the insulated partition 12 to control the flow of refrigerated air from the coil 52 through the outlet 28 to the storage chamber 14. The valve 68 is similarly movable into and out of engagement with the lower portion of the front panel 42 to vary the flow of air from the coil housing through the outlet 50 to the freezing chamber.

The valves 60 and 64 which control the air inlets to the upper portion of the coil housing are connected by means of a link 72 which is pivotally attached to valve 60 by the bracket 74 and similarly attached to the valve 64 by bracket 76. The length and form of the link is such that movement of the valve 64 to an opened position serves to close the valve 60, while closing of the valve 64 serves to open the valve 60. In this way the movement of valve 64 operates to control and proportion the flow of air into the coil housing from both the storage chamber and the freezing chamber.

The operation of the valve 68 near the lower portion of the coil housing is also controlled by the valve 64 through links 78 which extend downward adjacent the side panels 44 and are pivotally movable about the pins 80 which extend into slots 82 in the links 78. The upper end of each link 78 is connected at 84 to one of the links 72 which extends between valves 60 and 64 whereas the lower ends of the links 78 are formed with slots 86 for receiving pins 88 on the lower valve member 68.

With this construction movement of the valve 64 to permit air from the upper portion of the freezing chamber 16 to enter the inlet 48 in the upper portion of the coil housing, serves to close the valve 60 and prevent air from entering the housing from the storage chamber 14. At the same time opening of the valve 64 operates to move the valve 68 into position to open the outlet 50 to the lower portion of the freezing chamber and to close the outlet 28 to the storage chamber. On the other hand closing of the valve 64 serves to open valve 60 and moves valve 68 to cause air to flow from the lower portion of the coil housing through the outlet 28 to the lower portion of the storage chamber.

The valve 64 may be moved to any intermediate position desired to cause the air flowing downward through the housing and over the refrigerating coil 52 to be drawn from both chambers and discharged through both of the outlets 28 and 50. Moreover, the proportion of the air circulated through each chamber may be varied to maintain any desired temperature conditions in the freezing chamber and to maintain proper storage conditions in the storage chamber.

The refrigerating capacity of the coil 52 need be but little greater than that required to freeze products supplied to the relatively small freezing chamber 16; say to produce a temperature of $-10°$ F. in the freezing chamber. When this condition is maintained the temperature of the storage chamber may also be maintained without providing much if any additional capacity to the coil 52 since it is only necessary to withdraw enough heat from the storage chamber to balance the heat losses through the walls of the storage chamber and this heat will be withdrawn by circulating a limited amount of air through the storage chamber. This condition is represented by the position of the valves and by the arrows in Fig. 1 wherein the limited air circulation necessary to maintain the temperature for storing frozen foods or other products, say a temperature of 0° F. is indicated by the broken arrows and the more vigorous circulation of air required when freezing products in the chamber 13 is indicated by the full arrows. When operating in this way, foods may be frozen in the freezing chamber 16 while other foods are stored at a substantially constant temperature in the storage chamber 14.

After the food or other products in the freezing chamber have been properly frozen or reduced in temperature they can be transferred to the storage chamber without adversely affecting the temperature or condition of the food being preserved in the storage chamber. It is then possible to recharge the freezing chamber with additional products to be frozen.

In the alternative the temperature of the freezing chamber may be raised to that of the storage chamber by the proper opening of the valves 60, 64 and 68 as indicated by Fig. 6. The thermostat 90 controls operation of the coil to insure preservation of the desired temperature in the storage chamber. At such times the main circulation of air will be through the storage chamber since but little air need be circulated through the smaller freezing chamber to maintain it at the same temperature as the storage chamber.

By closing valve 64 which in turn completely closes air inlet 48 and air outlet 50, all circulation of air through the freezing chamber is prevented and cooling of freezing chamber 16 will be effected entirely through the conductivity of the cover panel 42 as this is being cooled by the air flowing over it and being circulated through the storage chamber. This condition is represented by Fig. 7 in which the conductivity of the material used in forming the cover plate 42 will largely control the temperature of chamber 16 and be sufficient to maintain the freezing chamber at a temperature of say 40° F., for use as a conventional or overflow refrigerator for domestic purposes. When the freezing chamber 16 is used with the valves completely closed the lack of forced air circulation therethrough is of particular advantage for the storage of unprotected foods that tend to dry out in the conventional domestic refrigerator with front opening doors where air circulation occurs every time doors are opened.

The construction described is most unusual in that the single thermostat 90 located in the storage chamber is the only temperature responsive element required and the remaining temperatures are controlled by the manually operable valve 64 to insure the same or predetermined differences in temperature of the freezing chamber while preserving substantially uniform temperature in the storage chamber.

The construction provides for still another and most important condition, namely that necessary for defrosting the coils 52 without scraping or other manual operations. This condition is represented by Fig. 8 wherein the cover 92 for the freezing chamber is removed and the air circulated so as to draw relatively warm air over the coils to melt the ice or frost which has accumulated thereon. At such times the valves 60 and 68 are closed so that no air flows through the storage chamber 14 while the insulating partition 12 prevents undue flow of heat into the storage chamber from the freezing chamber during the defrosting period.

For convenience in operation the cover panel 42 is provided with a peep hole covered by a movable member 98 so that the condition of the coil can be readily inspected. A drip pan 94 is provided to slip into the lower portion of the coil housing through the air outlet 50 so that water and slivers of ice falling from the coil will be caught and no drain for the freezing chamber need be used. The lower edge of the back plate 32 is formed with a lip 96 to direct moisture running down the back plate into the drip pan 94.

In using the construction described, the food to be frozen is first charged into the freezing chamber and the valves 60, 64 and 68 are set for freezing the food as represented by the condition shown in Fig. 1. When the food in the chamber 16 is suitably frozen it is transferred to the storage chamber 14 where it is maintained in a frozen condition while more food is charged into the freezing chamber and frozen without affecting the food in the storage chamber. When a suitable supply of frozen food has been accumulated in the storage chamber the valves are adjusted to positions such as those shown in Fig. 6 or 7 to establish a higher temperature in the freezing chamber. This higher temperature may be the same as that maintained in the storage chamber or it may be much higher, say 40° F., and thus serve as an overflow refrigerator for supplementing or replacing the usual domestic refrigerator. However, if some special occasion arises, as when extra ice cubes are needed or a frozen dessert is to be made, the temperature of the freezing chamber may be reduced quickly and easily by manual operation of the valve 64 without disturbing the storage chamber or altering its temperature. Finally when it is necessary to defrost the coil 52 the cover 92 is removed from the freezing chamber while the valves are set as shown in Fig. 8.

The valves may be operated manually by any suitable means but as shown the valve 64 is provided with an extension 65 which serves as a handle and is located adjacent and below the cover 92 of the freezing chamber and is positioned to cooperate with an index plate 67 that is suitably marked to indicate the desired conditions. This handle may be readily moved from one position to another and thus provide for manual control of the device.

In this way I have provided a single unit capable of use in freezing and storing frozen foods and yet adapted for household, hotel and store purposes wherein a single construction is required for performing different operations and for maintaining different refrigerating conditions. Although I have illustrated a construction in which the storage chamber is relatively large and the freezing chamber relatively small these proportions and the form and arrangement of the chambers or compartments in the structure may obviously be changed to meet any existing requirements. Similarly the structure need not house the compressor and motor if other sources of refrigeration are available. Moreover, the form, construction and arrangement of the refrigerating unit employed may be varied as desired and the number, type and arrangement of the valves and air circuits used in carrying my invention into effect may be altered and adapted for other installations. In view thereof it should be understood that the embodiment of my invention shown in the drawings and herein described is intended to be illustrative only and is not intended to limit the scope of my invention.

I claim:

1. A refrigerating device comprising a cabinet having relatively thick, insulated outer walls and having two chambers therein separated by an insulated partition, a refrigerating element located in one of said chambers adjacent said partition, means forming spaced passages for the flow of air to and from each of said chambers, a blower for forcing air over said refrigerating means and through said passages, valves controlling the flow of air through said passages for varying the flow of air through said chambers whereby the chambers may each be maintained at a predetermined temperature, means connecting said valves for simultaneous operation thereof, and manually operable means for actuating said valves.

2. A refrigerating device comprising a cabinet having two chambers therein, an insulated partition between said chambers, refrigerating means located in one of said chambers and adjacent said partition, a housing surrounding said refrigerating means, means forming air inlet passages extending from each of said chambers to said housing, means forming air outlet passages extending from said housing to each of said chambers, and means controlling the flow of air through said passages to and from each of said chambers to maintain predetermined temperatures in each chamber.

3. A refrigerating device comprising a cabinet having two chambers therein, insulated means located between said chambers, a refrigerating means located in one chamber adjacent said insulating means, a housing for said refrigerating means having air inlet openings at its upper end communicating with both chambers and air outlets at its lower end communicating with both chambers, means for drawing air from said inlets and serving to direct it downward through said housing and over said refrigerating means to said outlets, and valves for controlling the flow of air through said inlets and outlets to vary the temperature maintained in one of said chambers while maintaining a substantially constant temperature in the other chamber.

4. A storage and freezing device comprising a cabinet having relatively thick, insulated outer walls, a relatively large storage chamber and a relatively small freezing chamber located within said cabinet and separated by an insulated partition, refrigerating means located in the freezing chamber adjacent said partition, means for circulating air over said refrigerating means and through said chambers, a thermostat responsive to the temperature in said storage chamber controlling operation of said refrigerating means, and manually operable means for proportioning the circulation of air through both chambers.

5. A storage and freezing device comprising a cabinet having relatively thick, insulated outer walls, a relatively large storage chamber and a relatively small freezing chamber located within said cabinet and separated by an insulated partition, refrigerating means located in the freezing chamber adjacent said partition, means for circulating air over said refrigerating means and through said chambers, a thermostat responsive to the temperature in said storage chamber controlling operation of said refrigerating means, and manually operable means in the freezing chamber for proportioning the circulation of air through both chambers.

6. A storage and freezing device comprising a cabinet having a storage chamber and a freezing chamber therein, an insulated partition between said chambers, refrigerating means located in the freezing chamber adjacent said partition, a housing for said refrigerating means having inlet and outlet openings communicating with both chambers, a blower for forcing air over said refrigerating means and through said housing and openings, valves controlling said openings, and means connecting said valves for actuating the valves simultaneously to proportion the flow of air through said chambers.

7. A refrigerating device comprising a cabinet having a relatively large storage chamber and a relatively small freezing chamber therein, an insulated partition separating said chambers, a housing located in the freezing chamber adjacent said partition, a refrigerating coil located in said housing, means forming air inlet passages leading to the upper portion of said housing from each of said chambers, means forming air outlet passages leading from said housing to portions of each of said chambers below said inlet passages, means for forcing air through said housing and from said outlets, and valves controlling the flow of air through each of said passages for varying the flow of air through each of said chambers.

8. A refrigerating device comprising a cabinet having a relatively large storage chamber and a relatively small freezing chamber therein, an insulated partition separating said chambers, a housing located in the freezing chamber adjacent said partition, refrigerating means located in said housing, means forming air inlet passages leading to the upper portion of said housing from each of said chambers, means forming air outlet passages leading from said housing to portions of each of said chambers below said inlet passages, means for forcing air through said housing from said inlets toward said outlets, valves controlling the flow of air through each of said passages for varying the flow of air through each of said chambers, and means connecting said valves to actuate the same simultaneously to proportion the air passing through the housing to and from each chamber.

9. A refrigerating device comprising a cabinet having a relatively large storage chamber and a relatively small freezing chamber therein, an insulated partition separating said chambers, a housing located in the freezing chamber adjacent said partition, refrigerating means located in said housing, means forming air inlet passages leading to the upper portion of said housing from each of said chambers, means forming air outlet passages leading from said housing to portions of each of said chambers below said inlet passages, means for forcing air through said housing from said inlets toward said outlets, manually operable valves controlling the flow of air through each of said passages, means connecting said valves for simultaneously proportioning the air passing through the housing to and from each chamber, and a thermostat located in one chamber for controlling the operation of said refrigerating means.

10. A storage and freezing device comprising a cabinet having a storage chamber and a freezing chamber therein separated by an insulated partition, and means for maintaining the temperature within the storage chamber substantially constant while maintaining the freezing chamber at any of a plurality of predetermined temperatures, said maintaining means including a housing located in the freezing chamber adjacent said insulated partition, refrigerating means in said housing, means forming air inlet passages extending to said housing from both chambers, means forming air outlet passages extending from said housing to both of said chambers, a thermostat responsive to the temperature in said storage chamber controlling operation of said refrigerating means, and valves controlling the flow of air through said passages to and from said chambers.

11. A storage and freezing device comprising a cabinet having a storage chamber and a freezing chamber therein separated by an insulated partition, and means for maintaining the temperature within the storage chamber substantially constant while maintaining the freezing chamber at any of a plurality of predetermined temperatures, said maintaining means including a housing located in the freezing chamber adjacent said insulated partition, refrigerating means in said housing, means forming air inlet passages extending to said housing from both chambers, means forming air outlet passages extending from said housing to both of said chambers, a thermostat responsive to the temperature in said storage chamber controlling operation of said refrigerating means, manually operable valves controlling the flow of air through said passages to and from said chambers, and means connected to said valves to operate the same simultaneously to proportion the flow of air through said chambers.

12. A storage and freezing device comprising a cabinet having a storage chamber and a freezing chamber therein, an insulated partition between said chambers, refrigerating means located in the freezing chamber adjacent said partition, a housing for said refrigerating means having inlet and outlet openings communicating with both chambers, a blower for forcing air over said refrigerating means and through said housing and openings, valves controlling said openings, said freezing chamber having a door therein movable to admit air from the exterior of the cabinet to the freezing chamber, and valves controlling said openings and movable to direct air from the exterior of the cabinet over said refrigerating means to defrost the same and to close the openings to and from the storage chamber.

13. A storage and freezing device comprising a cabinet having a storage chamber and a freezing chamber therein, an insulated partition between said chambers, refrigerating means located in the freezing chamber adjacent said partition, a housing for said refrigerating means having inlet and outlet openings communicating with both chambers, a blower for forcing air over said refrigerating means and through said housing and openings, valves controlling said openings, said freezing chamber having a door therein movable to admit air from the exterior of the cabinet to the freezing chamber, manually operable valves controlling said openings, and means connecting said valves together for simultaneous movement to a position in which the valves serve to direct air entering the freezing chamber from the exterior of the cabinet to said housing and to prevent the flow of air from the freezing chamber to the storage chamber.

14. A storage and freezing device comprising a cabinet having a storage chamber and a freezing chamber therein, an insulated partition between said chambers, refrigerating means located in the freezing chamber adjacent said partition, a housing for said refrigerating means having inlet and outlet openings communicating with both chambers, a blower for forcing air over refrigerating means through said housing and openings, valves controlling said openings, said freezing chamber having a door therein movable to admit air from the exterior of the cabinet to the freezing chamber, manually operable valves controlling said openings, and means connecting said valves together for simultaneous movement to a position in which the valves serve to direct air entering the freezing chamber from the exterior of the cabinet to said housing and prevent the flow of air from the freezing chamber to the storage chamber, and a thermostat in the storage chamber controlling operation of said refrigerating means.

15. A refrigerated cabinet having an insulating partition therein dividing the interior of the cabinet into two chambers, means forming two spaced passages providing communication between said chambers, a refrigerating element in one of said chambers, a housing for said refrigerating element having an inlet communicating with one of said passages and an outlet communicating with the other of said passages, means for forcing air from said inlet through said housing and over said refrigerating element to said outlet, and means controlling the flow of air through said housing and passages to establish independent circulation of air through each chamber independently and back to the housing, and means for actuating said control means to vary the amount of air circulated through each chamber to maintain a predetermined temperature in each chamber independently of the temperature of the other chamber.

16. A refrigerating device comprising a cabinet having a storage chamber and a freezing chamber therein, a refrigerating unit, means forming inlet passages extending from each of said chambers to said unit, means forming outlet passages extending from said unit to each of said chambers, means for positively circulating air over said unit and through said passages in a direction from said inlet passages toward said outlet passages, valve means controlling the flow of air through said passages and to and from said unit, and operating means connected to said valve means for simultaneously moving the valve means to increase the amount of air circulated through one of said chambers and to decrease the amount of air circulated through the other of said chambers.

17. A refrigerating device comprising a cabinet having a storage chamber and a freezing chamber therein, a refrigerating unit, means forming inlet passages extending from each of said chambers to said unit, means forming outlet passages extending from said unit to each of said chambers, means for positively circulating air over said unit and through said passages in a direction from said inlet passages toward said outlet passages, valve means controlling the flow of air through said passages and to and from said unit, operating means connected to said valve means for simultaneously moving the valve means to increase the amount of air circulated through one of said chambers and to decrease the amount of air circulated through the other of said chambers, and a thermosat responsive to the temperature in the storage chamber for controlling the operation of said refrigerating means to maintain the storage chamber at a substantially constant temperature.

RUSH S. HARTMAN.

REFERENCES CITED

The following references are of record in the file of this patent:

UNITED STATES PATENTS

| Number | Name | Date |
| --- | --- | --- |
| 2,012,527 | Batchelder | Aug. 27, 1935 |
| 2,133,958 | Kalischer | Oct. 25, 1938 |
| 2,259,803 | Cumming | Oct. 21, 1941 |
| 2,346,287 | Borgerd et al. | Apr. 11, 1944 |